United States Patent
Ozcelik et al.

(10) Patent No.: US 12,542,943 B2
(45) Date of Patent: Feb. 3, 2026

(54) DYNAMIC CONTENT FILLING SYSTEM FOR AVOIDANCE OF SLATE PLAYBACK DURING LIVE STREAMS

(71) Applicant: Roku, Inc., San Jose, CA (US)

(72) Inventors: Ihsan Mert Ozcelik, London (GB); James Eberhard Lanikai Palmer, San Jose, CA (US); Nguyen Pham Thanh Nguyen, San Jose, CA (US)

(73) Assignee: Roku, Inc., San Jose, CA (US)

( * ) Notice: Subject to any disclaimer, the term of this patent is extended or adjusted under 35 U.S.C. 154(b) by 0 days.

(21) Appl. No.: 18/675,874

(22) Filed: May 28, 2024

(65) Prior Publication Data

US 2025/0373874 A1 Dec. 4, 2025

(51) Int. Cl.
*H04N 21/262* (2011.01)
*H04N 21/2187* (2011.01)
*H04N 21/235* (2011.01)
*H04N 21/81* (2011.01)

(52) U.S. Cl.
CPC ... *H04N 21/26241* (2013.01); *H04N 21/2187* (2013.01); *H04N 21/2353* (2013.01); *H04N 21/812* (2013.01)

(58) Field of Classification Search
CPC ......... H04N 21/26241; H04N 21/2187; H04N 21/2353; H04N 21/812
See application file for complete search history.

(56) References Cited

U.S. PATENT DOCUMENTS 12,363,398 B1 * 7/2025 Wu ...................... H04N 21/845
2023/0069253 A1 * 3/2023 Pressnell ............ H04N 21/8586

* cited by examiner

*Primary Examiner* — Anthony Bantamoi
(74) *Attorney, Agent, or Firm* — STERNE, KESSLER, GOLDSTEIN & FOX P.L.L.C.

(57) ABSTRACT

Disclosed herein are system, method and/or computer program product embodiments, and/or combinations and subcombinations thereof for avoiding slate playback during live streams through dynamic content filling. An example embodiment operates by receiving, from an origin server, a manifest associated with live streaming content, analyzing the manifest to identify an advertising time window in the live streaming content, wherein the manifest specifies a slate to be played during the advertising time window, determining a portion of the advertising time window that cannot be filled by advertisements identified by an advertising decision server, identifying one or more content items to be played back during the portion of the advertising time window, updating the manifest to specify that the one or more content items are to be played back during the portion of the advertising time window instead of the slate, and transmitting the updated manifest to a media player.

20 Claims, 7 Drawing Sheets

DYNAMIC CONTENT FILLING SYSTEM FOR AVOIDANCE OF SLATE PLAYBACK DURING LIVE STREAMS

BACKGROUND

Field

This disclosure is generally directed to techniques for improving the playback of live streaming content and, in particular, to techniques for avoiding the playback of slates during the playback of live streaming content.

SUMMARY

Provided herein are system, apparatus, article of manufacture, method and/or computer program product embodiments, and/or combinations and sub-combinations thereof, for avoiding slate playback during live streams through dynamic content filling. An example embodiment performs operations including receiving, from an origin server, a manifest associated with live streaming content, analyzing the manifest to identify an advertising time window in the live streaming content, wherein the manifest specifies a slate to be played during the advertising time window, determining a portion of the advertising time window that cannot be filled by advertisements identified by an advertising decision server, identifying one or more content items to be played back during the portion of the advertising time window, updating the manifest to specify that the one or more content items are to be played back during the portion of the advertising time window instead of the slate, and transmitting the updated manifest to a media player.

In some aspects, determining the portion of the advertising time window that cannot be filled by advertisements identified by the advertising decision server comprises: sending a request for advertisements to the advertising decision server; receiving, from the advertising decision server, a response that identifies a set of advertisements; identifying transcoded versions associated with at least a subset of the set of advertisements; obtaining a fill duration by summing durations respectively associated with the transcoded versions; subtracting the fill duration from a duration of the advertising time window to obtain a remaining duration; and determining the portion of the advertising time window to be a final portion of the advertising time window having the remaining duration.

In some aspects, determining the portion of the advertising time window that cannot be filled by advertisements identified by the advertising decision server comprises: sending a request for advertisements to the advertising decision server; receiving, from the advertising decision server, a response that identifies no advertisements; and, in response to receiving the response that identifies no advertisements, determining the portion of the advertising time window to be an entirety of the advertising time window.

In some aspects, determining the portion of the advertising time window that cannot be filled by advertisements identified by the advertising decision server comprises: determining that communication with the advertising decision server has failed; and, in response to determining that communication with the advertising decision server has failed, determining the portion of the advertising time window to be an entirety of the advertising time window.

In some aspects, the operations further comprise: establishing a live streaming session with the media player; and maintaining metadata associated with the live streaming session; wherein identifying the one or more content items to be played back during the portion of the advertising time window comprises selecting the one or more content items based at least on the metadata associated with the live streaming session. In further accordance with such an embodiment, the metadata associated with the live streaming session may comprise one or more of user metadata or live streaming content metadata.

In some aspects, identifying the one or more content items to be played back during the portion of the advertising time window comprises: identifying a plurality of content items, wherein each content item in the plurality of content items has a different duration.

In some aspects, identifying the one or more content items to be played back during the portion of the advertising time window comprises: selecting a plurality of content items having a combined duration that comes closest to a duration of the portion of the advertising time window without exceeding the duration of the portion of the advertising time window.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
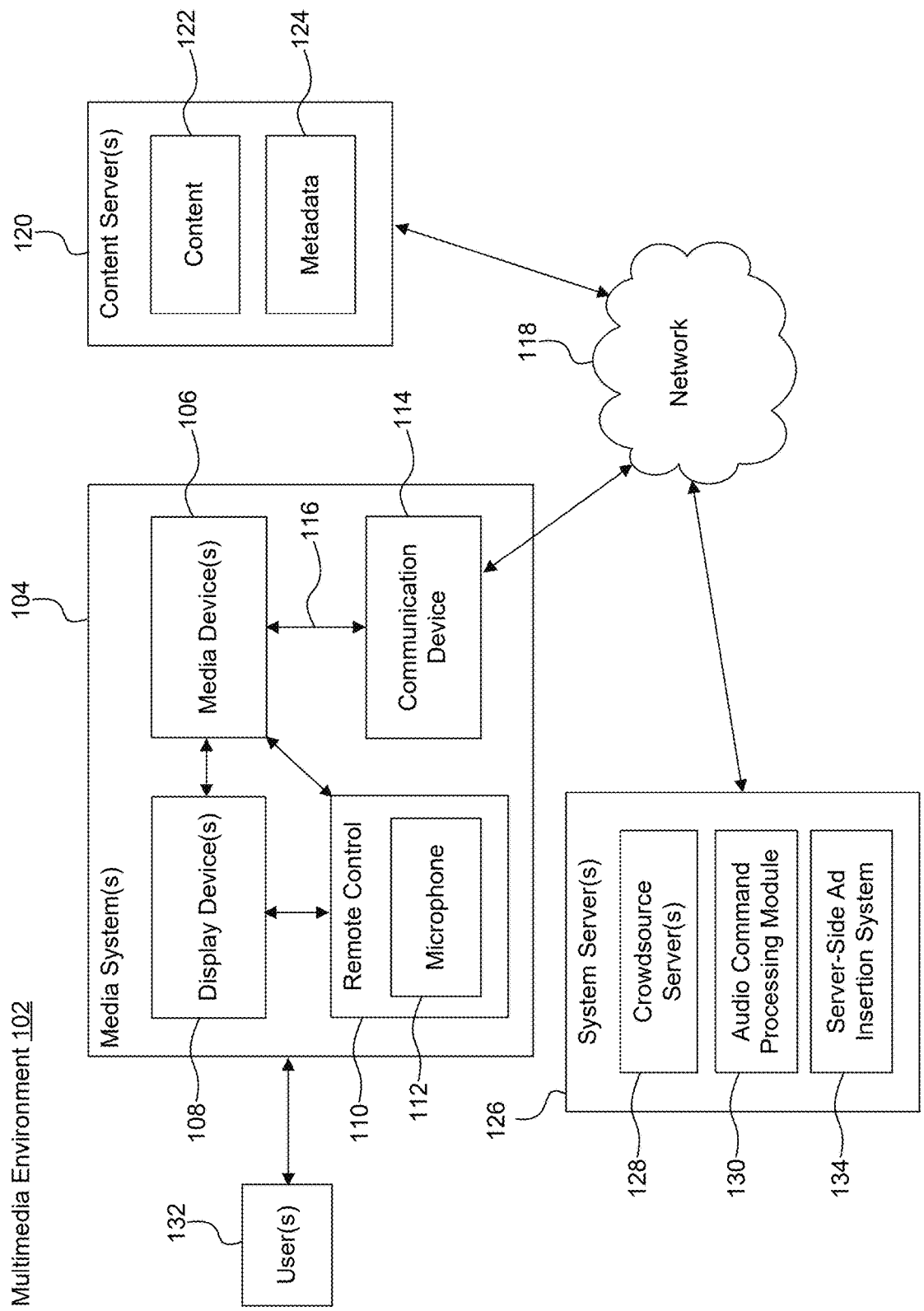
FIG. 1 illustrates a block diagram of a multimedia environment, according to some embodiments.

A provider of live streaming content may periodically or intermittently insert advertising ("ad") breaks into the content being live streamed. A server-side advertisement ("ad") insertion system may operate to fill each ad break with ads that are selected on a per-user basis. For example, the ad insertion system may interact with an advertising ("ad") decision server to determine a set of ads to fill an ad break for a particular user playing the live streaming content on his/her media player. This may entail, for example, the ad insertion system sending a request to the ad decision server that includes information including the duration of the ad break as well as user-specific and content-specific metadata, receiving a response from the ad decision server that identifies one or more targeted ads selected by the ad decision server based on the provided information, and filling the ad break with the targeted ads selected by the ad decision server.

However, in some scenarios, the ad insertion system may be incapable of filling or completely filling the ad break with ads. This may occur, for example, if the ad decision server responds to the request from the ad insertion system with no ads, or with a set of ads having a combined duration that is less than the duration of the ad break. This may also occur, for example, due to a communication failure with respect to the ad decision server (e.g., due to a network outage, an outage at the ad decision server, a request timeout, or the like) or if a transcoded version of an ad selected by the ad decision server is not yet available for playback. To address these possibilities, a provider of live streaming content may be enabled to designate a slate (also sometimes referred to as an "ad slate") that can be played back by default during a portion of an ad break that cannot be filled with ads selected by the ad decision server. A slate may comprise, for example, a video segment that shows a static image, a countdown, or the like, and that may include generic messages such as "We'll be right back" or "More content coming up". More generally, however, a slate may comprise any type of content that may be played back by default during an unfilled portion of an ad break.

The end user experience associated with viewing slates can be a poor one since the presentation of slates may interrupt the flow of content and reduce content quality. As a result, the playback of slates may result in reduced user engagement. In this regard, research has shown that users are more inclined to stop viewing live streaming content when slates are not replaced with any dynamically-selected advertising content. Additionally, the playback of slates may damage a brand, reputation, and/or credibility of a provider of live streaming content, as such playback may signal a lack of professionalism, reliability, and/or quality. Furthermore, from a monetization standpoint, the playback of slates represents a lost revenue opportunity, since such playback does not generate any ad impressions or revenue.

Provided herein are system, method and/or computer program product embodiments, and/or combinations and sub-combinations thereof, for avoiding slate playback during live streams that addresses one or more of the foregoing issues associated with conventional server-side ad insertion systems. As will be discussed in more detail herein, a server-side ad insertion system in accordance with an embodiment may operate to determine a portion of an ad break in live streaming content that cannot be filled by advertisements identified by an ad decision server, identify one or more content items to be played back during the portion of the ad break, and then cause the portion of the ad break to be filled with the one or more content items rather than with a default slate associated with the live streaming content. The ad insertion system may dynamically select (e.g., target or personalize) the one or more content items to be played back during the portion of the ad break based on information associated with the particular live streaming session, such as user metadata and/or live-streaming content metadata associated with the particular live streaming session.

Since embodiments described herein may operate to fill a portion of the ad break that would otherwise be filled by a slate with one or more dynamically-selected content items tailored to a particular live streaming session (e.g., tailored to a particular viewer and/or a particular live stream associated with a live streaming session), such embodiments may provide a technical solution to the above-described technical problem of unfilled ad breaks resulting in slate playback. For example, such embodiments may avoid slate playback when the ad insertion system cannot fill, or entirely fill, an ad break due to such technical factors as: an inability of an ad decision server to identify ads of sufficient duration to fill an ad break, communication issues between the ad insertion system and the ad decision server, the unavailability of transcoded versions of selected ads, or the like.

Furthermore, by filling the portion of the ad break that would otherwise be filled by a slate with one or more dynamically-selected content items tailored to a particular live streaming session, embodiments described herein may improve the user experience of viewers of live streaming content by avoiding the disturbing and jarring effects associated with viewing slates during playback. This can in turn increase user engagement with such live streaming content. By avoiding slate playback, embodiments described herein can also help protect a brand, reputation, and/or credibility of a provider of live streaming content. Still further, because certain embodiments described herein can present one or more dynamically-selected advertisements or promotions in place of a slate, such embodiments can recapture a revenue opportunity that might otherwise be lost due to slate playback.

These and various other features and advantages of a system, method and/or computer program product, and/or combinations and sub-combinations thereof, for avoiding slate playback during live streams will be described in detail herein in reference to various embodiments. Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to the multimedia environment 102, as will be appreciated by persons skilled in the relevant art(s) based on the teachings contained herein. An example of the multimedia environment 102 shall now be described.

Multimedia Environment

FIG. 1 illustrates a block diagram of a multimedia environment 102, according to some embodiments. In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. A media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with the media system 104 to select and consume content.

Each media system 104 may include one or more media devices 106 each coupled to one or more display devices 108. It is noted that terms such as "coupled," "connected to," "attached," "linked," "combined" and similar terms may refer to physical, electrical, magnetic, logical, etc., connections, unless otherwise specified herein.

Media device 106 may be a streaming media device, DVD or BLU-RAY device, audio/video playback device, cable box, and/or digital video recording device, to name just a few examples. Display device 108 may be a monitor, television (TV), computer, smart phone, tablet, wearable (such as a watch or glasses), appliance, internet of things (IoT) device, and/or projector, to name just a few examples. In some embodiments, media device 106 can be a part of, integrated with, operatively coupled to, and/or connected to its respective display device 108.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as Wi-Fi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106 and/or display device 108, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106 and/or display device 108 using cellular, Bluetooth, infrared, etc., or any combination thereof. Remote control 110 may include a microphone 112, which is further described below.

Multimedia environment 102 may include a plurality of content servers 120 (also called content providers, channels or sources 120). Although only one content server 120 is shown in FIG. 1, in practice multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form. In some embodiments, content server(s) 120 may include a live streaming content origin server and content 122 may comprise live streaming content.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to the content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media devices 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streamings of the movie.

System servers 126 may also include an audio command processing module 130. As noted above, remote control 110 may include microphone 112. Microphone 112 may receive audio data from users 132 (as well as other sources, such as the display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize user 132's verbal command. Audio command processing module 130 may then forward the verbal command back to media device 106 for processing.

Figure 2:
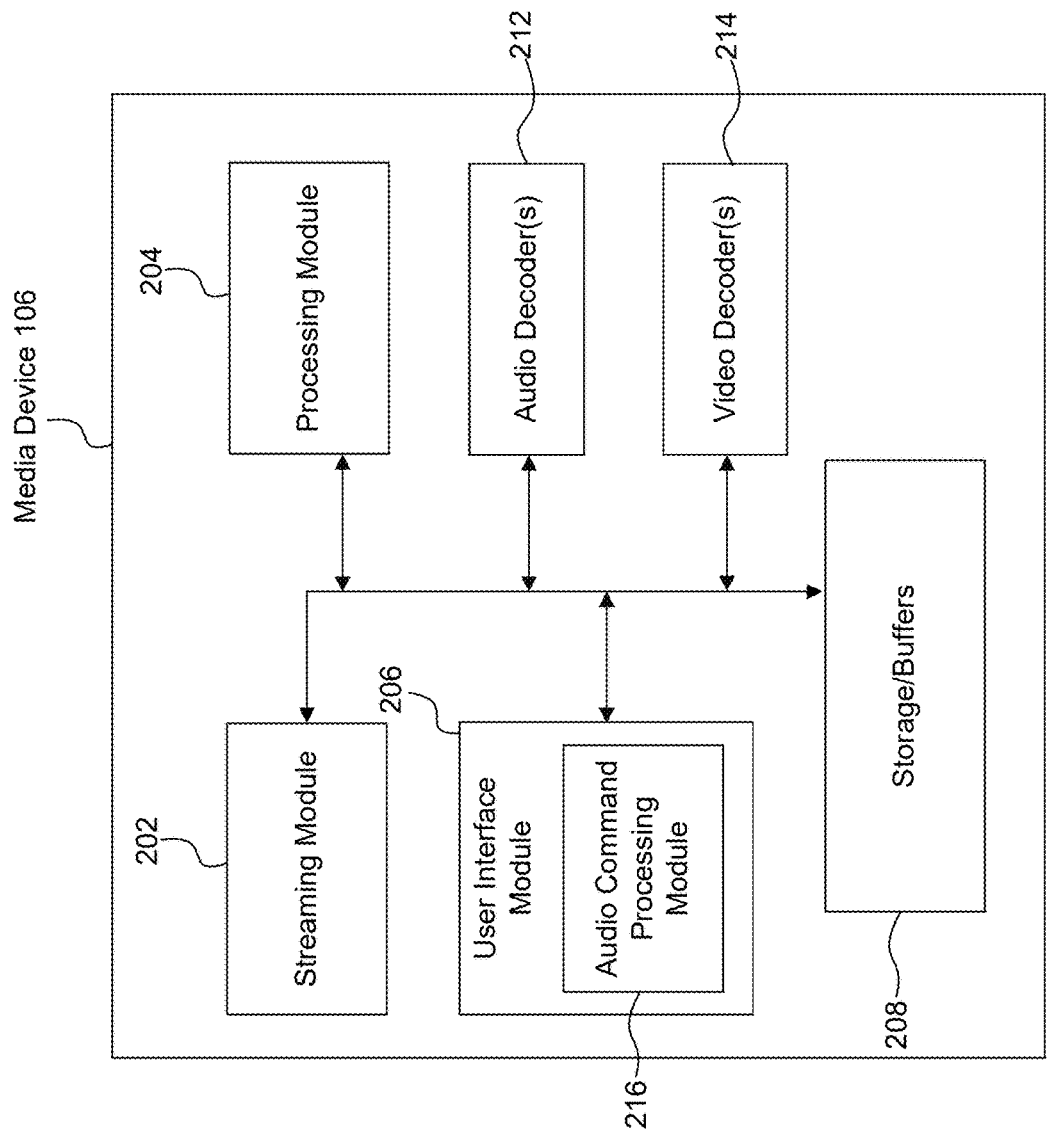
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

System servers 126 may also comprise a server-side advertisement ("ad") insertion system 134, which will be described in more detail herein. Server-side ad insertion system 134 may operate to cause ads and/or other content to be played back during designated ad breaks in live streaming content that is obtained from content server(s) 120 and provided to media device 106 for playback thereby.

FIG. 2 illustrates a block diagram of an example media device 106, according to some embodiments. Media device 106 may include a streaming module 202, a processing module 204, storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, H.265, AVI, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 for playback to user 132.

In streaming embodiments, streaming module 202 may transmit the content to display device 108 in real time or near real time as it receives such content from content server(s) 120. In non-streaming embodiments, media device 106 may store the content received from content server(s) 120 in storage/buffers 208 for later playback on display device 108.

In further embodiments, user 132 may interact with media device 106 via, for example, remote control 110. For example, user 132 may use remote control 110 to interact with user interface module 206 of media device 106 to select live streaming content. Streaming module 202 of media device 106 may request the selected live streaming content from content server(s) 120 over network 118. Content server(s) 120 may transmit the requested live streaming content to streaming module 202. Through processes that will be described in more detail herein, server-side ad insertion system 134 may cause ads or other content to be inserted into designated ad breaks in the live streaming content, and such ads or other content will also be transmitted to streaming module 202. Media device 106 may transmit the received live streaming content and the inserted ads or other content to display device 108 for playback to user 132.

Figure 3:
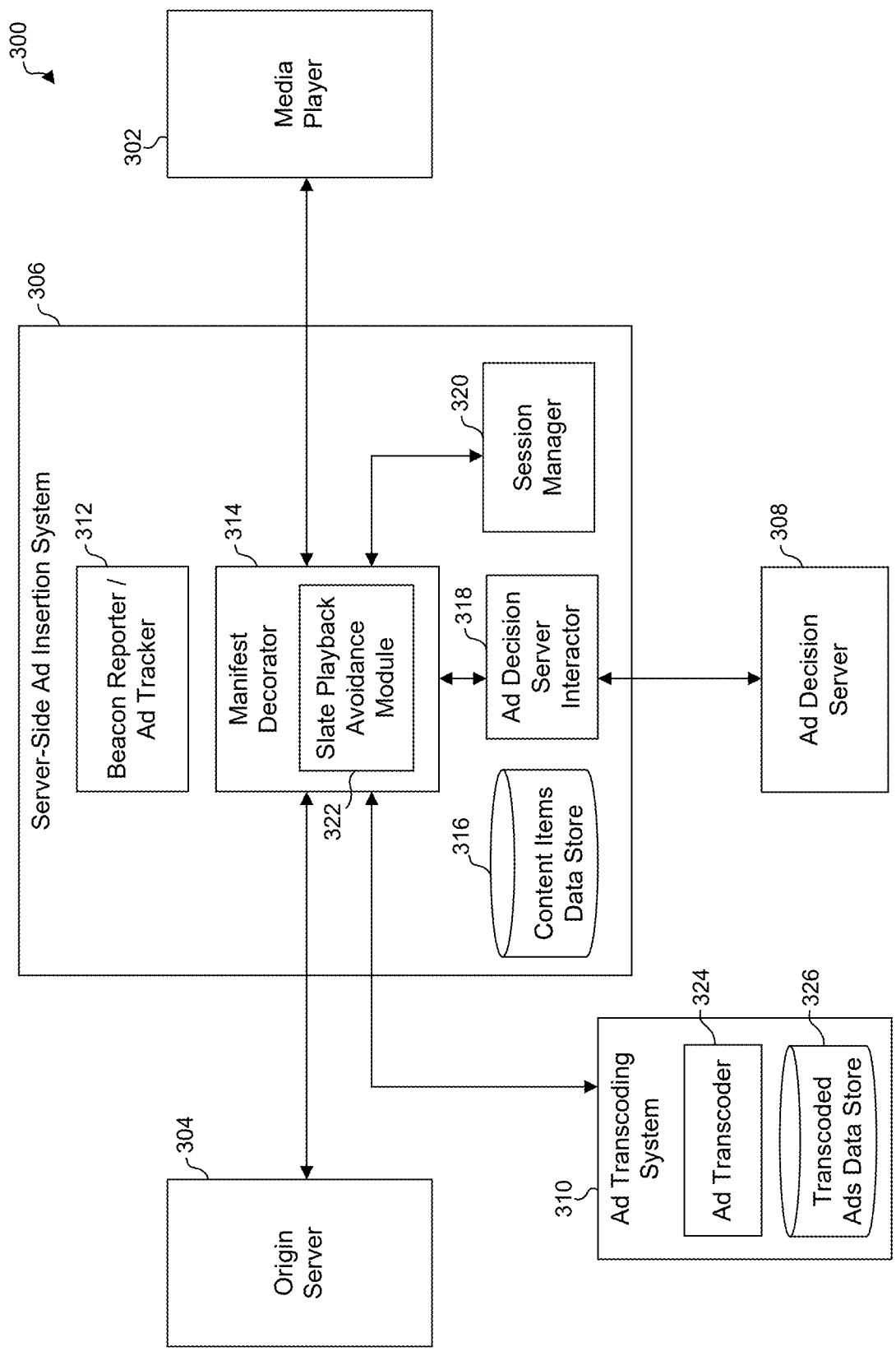
FIG. 3 illustrates a block diagram of a system for avoiding slate playback during live streams through dynamic content filling, according to some embodiments.

Dynamic Content Filling System for Avoidance of Slate Playback During Live Streams FIG. 3 illustrates a block diagram of a system 300 for avoiding slate playback during live streams through dynamic content filling, according to some embodiments. As shown in FIG. 3, system 300 includes a media player 302, an origin server 304, a server-side advertisement ("ad") insertion system 306, an advertising ("ad") decision server 308 and an advertisement ("ad") transcoding system 310. Each of these components will now be described.

Media player 302 generally represents any device that is capable of playing back live streaming content that is received over a network. Media player 302 may represent media device 106 as previously described in reference to FIGS. 1 and 2. Media player 302 may comprise, for example, a streaming media device, a cable or satellite set top box, a smart TV, a computer, a smart phone, a tablet, a wearable, or the like. Depending upon the implementation, media player 302 may present content being played back to a user via an integrated display and/or speaker(s), or via a display and/or speaker(s) to which media device is connected via a wired and/or wireless connection.

Origin server 304 is a server associated with a provider of live streaming content. Origin server 304 may be implemented, for example, using one or more server computers. Origin server 304 may comprise one of content server(s) 120 as previously described in reference to FIG. 1. Among other functions, origin server 304 is configured to periodically generate manifests that may be provided to a media player (e.g., media player 302) in response to periodic requests therefrom and that include information that is useable by the media player to download and play back successive video segments of live streaming content. A manifest may comprise a text file that specifies uniform resource locators (URLs) of video segments that may be downloaded for playback by a media player, and an order in which such video segments should be played back. One non-limiting example of a manifest is a M3U8 manifest file. Because live streaming content is continuously generated and consumed, origin server 304 is configured to continuously publish new manifests over time, wherein each newly-published manifest identifies the latest video segments of the live streaming content that are available for download by media players.

In addition to identifying video segments of the live streaming content for playback and download, a manifest generated by origin server 304 may also identify one or more ad breaks in the live streaming content. An ad break comprises a time window of a specified duration within the live streaming content during which advertisements may be inserted or replaced. A manifest generated by origin server 304 may also specify a URL of a slate (e.g., a video asset) that may be downloaded and played back during an ad break if the ad break cannot be fully populated with ads.

Server-side ad insertion system 306 is a system that is communicatively connected between media player 302 and origin server 304. Server-side ad insertion system 306 may be implemented, for example, using one or more server computers. Server-side ad insertion system 306 may represent server-side ad insertion system 134 as previously described in reference to FIG. 1. Server-side ad insertion system 306 may be communicatively connected to each of media player 302 and origin server 304 via one or more networks, such as network 118 as previously described in reference to FIG. 1. As shown in FIG. 3, server-side ad insertion system 306 includes a number of components, including a beacon reporter/ad tracker 312, a manifest decorator 314, an ad decision server interactor 318, and a session manager 320. Each of these components may be implemented, for example, as software that is executed by one or more processors of one or more server computers.

In certain implementations, to play back live streaming content, media player 302 may first send a request to server-side ad insertion system 306 to establish a live streaming session therewith. Session manager 320 may be configured to establish the live streaming session in response to receiving the request and to store and manage session state throughout the duration of the live streaming session. The session state associated with a particular live streaming session may include, for example, metadata about the user of media player 302 and/or metadata associated with the live streaming content that is being viewed.

After a live streaming session has been established, media player 302 may periodically send requests for a manifest associated with the live streaming content to server-side ad insertion system 306. Manifest decorator 314 may be configured to receive such requests and forward them to origin server 304. In response to receiving each such request, origin server 304 may return to manifest decorator 314 a manifest associated with the live streaming content. As previously discussed, each manifest returned by origin server 304 may specify URLs of sequential video segments of the live streaming content that may be downloaded for playback by media player 302, one or more ad breaks in the live streaming content, as well as a URL of a slate that may be downloaded for playback during an ad break if the ad break cannot be fully populated with ads.

Manifest decorator 314 may be further configured to, upon receiving a manifest from origin server 304, analyze the manifest to identify any ad breaks specified therein. In response to detecting an ad break, manifest decorator 314 may invoke ad decision server interactor 318 to send a request for ads with which to fill the ad break to ad decision server 308. The request may include, for example, a duration of the ad break as well as user- and/or content-specific metadata that may be used by ad decision server 308 to select targeted or personalized ads for the particular user and/or the particular live streaming session. In response to receiving such request, ad decision server 308 may identify one or more ads for filling the ad break and may send a response identifying such ads to manifest decorator 314 via ad decision server interactor 318.

Upon receiving the response from ad decision server 308, manifest decorator 314 may determine if the ads selected by ad decision server 308 have already been transcoded by ad transcoding system 310 into versions suitable for playback by media player 302. If a required transcoded version exists, then it will already be stored in a transcoded ads data store 326 of ad transcoding system 310. However, if a suitable transcoded version does not exist, then manifest decorator 314 may request that ad transcoder 324 of ad transcoding system 310 begin transcoding the ad. In this case, manifest decorator 314 may not be able to fill the current ad break with the ad, although it may fill a future ad break in the live streaming session with the ad once the transcoded version becomes available.

Once manifest decorator 314 has identified the available transcoded versions of the ads selected by ad decision server 308, it updates the manifest to specify that the transcoded versions of the ads, identified by respective URLs, are to be downloaded and played back by media player 302 during the ad break, rather than the aforementioned slate.

For a variety of reasons, it is possible that the duration of the ad break cannot be filled, or completely filled, by ads identified by ad decision server 308. For example, the response from ad decision server 308 that is provided to manifest decorator 314 may not identify any ads. As another example, the response from ad decision server 308 may identify a set of ads wherein the transcoded versions thereof have a combined duration that is less than the duration of the ad break. As yet another example, the response from ad decision server 308 may identify one or more ads for which a respective suitable transcoded version is not currently available. As still another example, manifest decorator 314 may be unable to communicate with ad decision server 308 due to a network outage or an outage at ad decision server 308, or may fail to receive a timely response from ad decision server 308 (e.g., due to a request timeout).

A slate identified in the manifest may populate by default any portion of the ad break that cannot be filled by ads identified by ad decision server 308. However, for various reasons discussed above, slate playback may be deemed undesirable. Consequently, manifest decorator 314 includes a slate playback avoidance module 322 that is configured to identify a portion of the ad break that cannot be filled by ads identified by ad decision server 308 and to fill such portion of the ad break with one or more dynamically-selected content items. The manner of operation of slate playback avoidance model 322 will now be described.

As noted above, slate playback avoidance module 322 may identify the portion of the ad break that cannot be filled by ads identified by ad decision server 308. In certain scenarios, this may entail manifest decorator 314 receiving from ad decision server 308 a response that identifies a set of ads. Upon receiving such response, manifest decorator 314 may identify transcoded versions associated with at least a subset of the set of ads that are available in transcoded ads data store 326. Manifest decorator 314 may update the manifest to specify that the transcoded versions are to be played back during an initial portion of the ad break rather than the slate. Slate playback avoidance module 322 may then calculate a fill duration by summing durations respectively associated with the transcoded versions, subtract the fill duration from the duration of the ad break to obtain a remaining duration, and determine the portion of the ad break that cannot be filled by ads identified by ad decision server 308 to be a final portion of the ad break having the remaining duration.

In other scenarios, manifest decorator 314 may receive from ad decision server 308 a response to a request for ads that identifies no ads. In such a scenario, slate playback avoidance module 322 may identify the portion of the ad break that cannot be filled by ads identified by ad decision server 308 to be the entirety of the ad break.

In still other scenarios, manifest decorator 314 may determine that communication with ad decision server 308 has failed such that no identification of ads can be requested and/or received from ad decision server 308. In such a scenario, slate playback avoidance module 322 may identify the portion of the ad break that cannot be filled by ads identified by ad decision server 308 to be the entirety of the ad break.

Once slate playback avoidance module 322 has determined the portion of the ad break that cannot be filled by advertisements identified by ad decision server 308, slate playback avoidance module 322 may select one or more content items from a content items data store 316 to be played back during the unfilled portion. Such content items may comprise, for example, video content such as video advertisements or promotions. However, this is only an example, and various other types of content items may be stored in content items data store 316 and selected by slate playback avoidance module 322.

Slate playback avoidance module 322 may select the one or more content items from content items data store 316 based in part on user metadata and/or live streaming content metadata that is stored by session manager 320 in association with the relevant live streaming session. Thus, the content items may be selected in a manner that is targeted or personalized to the user viewing the live streaming content and/or to the live streaming content itself. In some aspects, the session metadata that is used for selecting content items may include information about the user and/or the live streaming content that extends beyond information that may be included in manifest requests from media player 302 or that is provided to ad decision server 308 as part of an ad request.

For example, content items may be labelled with metadata such as genre, language, country, suitability for children, and such metadata may be used to select content items that are appropriate for a given user and/or live streaming content associated with a live streaming session. In certain implementations, a machine learning algorithm may be used to select content items that are appropriate for a given user and/or live streaming content associated with a live streaming session.

Slate playback avoidance module 322 may select the one or more content items from content items data store 316 based also in part on the duration of the portion of the ad break that cannot be filled by ads identified by ad decision server 308. For example, slate playback avoidance module 322 may be configured to select one or more content items having a combined duration that comes closest to the duration of the portion of the ad break without exceeding the duration of the portion of the ad break. In certain implementations, Slate playback avoidance module 322 may also select a plurality of content items from content items data store 316, wherein each of content item in the plurality of content items has a different duration. For example, if the ad break is 2 minutes long and the portion of the ad break that cannot be filled by ads identified by ad decision server 308 is the last 45 seconds of the 2 minutes, slate playback avoidance module 322 may select a first content item having a 30 second duration and a second content item having a 15 second duration for sequential playback during the last 45 second portion.

In certain implementations, content items data store 316 is pre-provisioned with multiple versions of each content item that may be selected for playback by slate playback avoidance module 322. Each version may be transcoded to support playback using a different playback format and/or by a different media player. In accordance with such implementations, content items selected for playback from content items data store 316 by slate playback avoidance module 322 may not need to be transcoded in real time.

In a further implementation, content items data store 316 may also be pre-provisioned with multiple versions of each content item that may be selected for playback by slate playback avoidance module 322, wherein each version may be of a different duration. For example, a 15 second version of a particular content item may be available as well as a 30 second version of the same content item. This may provide additional flexibility to slate playback avoidance module 322 in terms of selecting personalized or targeted content items that will fit into a portion of an ad break having a particular duration.

Although content items data store 316 is shown as being part of server-side ad insertion system 306 in FIG. 3, such data store may also be part of a system that is separate and/or remote from server-side ad insertion system 306, so long as the content items stored therein can be identified for inclusion in a manifest by slate playback avoidance module 322 and subsequently downloaded for playback by media players, such as media player 302.

Once slate playback avoidance module 322 has identified one or more content items to be played back during the portion of the ad break that could not be filled by ads identified by ad decision server 308, slate playback avoidance module 322 may update the manifest to specify that the identified content item(s) are to be played back during the portion of the ad break instead of the slate. This may entail, for example, including URL(s) of the identified content item(s) in the manifest in association with the portion of the ad break that would otherwise have been associated with the slate.

After slate playback avoidance module 322 has finished updating the manifest, manifest decorator 314 may transmit the updated manifest to media player 302. Media player 302 may receive the updated manifest and, based thereon, download the various live streaming content video segments, transcoded versions of ads (if any) identified by ad decision server 308, and content item(s) identified by slate playback avoidance module 322 based on the various URLs included in the manifest. Media player 302 may then play back these content items in the order specified by the manifest.

When the user of media player 302 watches or otherwise interacts with an ad identified by ad decision server 308, media player 302 may send a signal to beacon reporter/ad tracker 312 so that such viewing or interaction may be tracked and reported as desired or needed. It is noted that a similar tracking and reporting mechanism may be used to track and report when the user of media player 302 watches or otherwise interacts with a content item identified by slate playback avoidance module 322.

It is to be understood that the foregoing operations of server-side ad insertion system 306 that are performed with respect to a particular ad break in a particular manifest may be performed for multiple ad breaks across multiple manifests on an ongoing basis during a live streaming session.

Also, although only a single media player 302 is shown in FIG. 3 for the sake of illustration, it is to be understood that any number of media players may concurrently establish live streaming sessions with server-side ad insertion system 306. Furthermore, server-side ad insertion system 306 may populate ad breaks associated with the same live streaming content with different (e.g., personalized) content for different live streaming sessions. As a result, each media player may download different ads (e.g., ads identified by ad decision server 308) and content items (e.g., content items identified by slate playback avoidance module 322) for playback during the same ad break.

In some implementations, media player 302 does not interact directly with server-side ad insertion system 306 but instead interacts with server-side ad insertion system 306 via a content delivery network (CDN) that is communicatively connected between server-side ad insertion system 306 and media player 302. Such CDN may forward requests from media player 302 to server-side ad insertion system 306 and forward manifests from server-side ad insertion system 306 to media player 302. Such CDN may also cache video segments, ads, and content items requested for playback by various media players, so that such content may be efficiently provided to other media players connected to the same CDN. In some further implementations, server-side ad insertion system 306 may communicate with origin server 304 and/or ad transcoding system 310 via a CDN as well.

Figure 4:
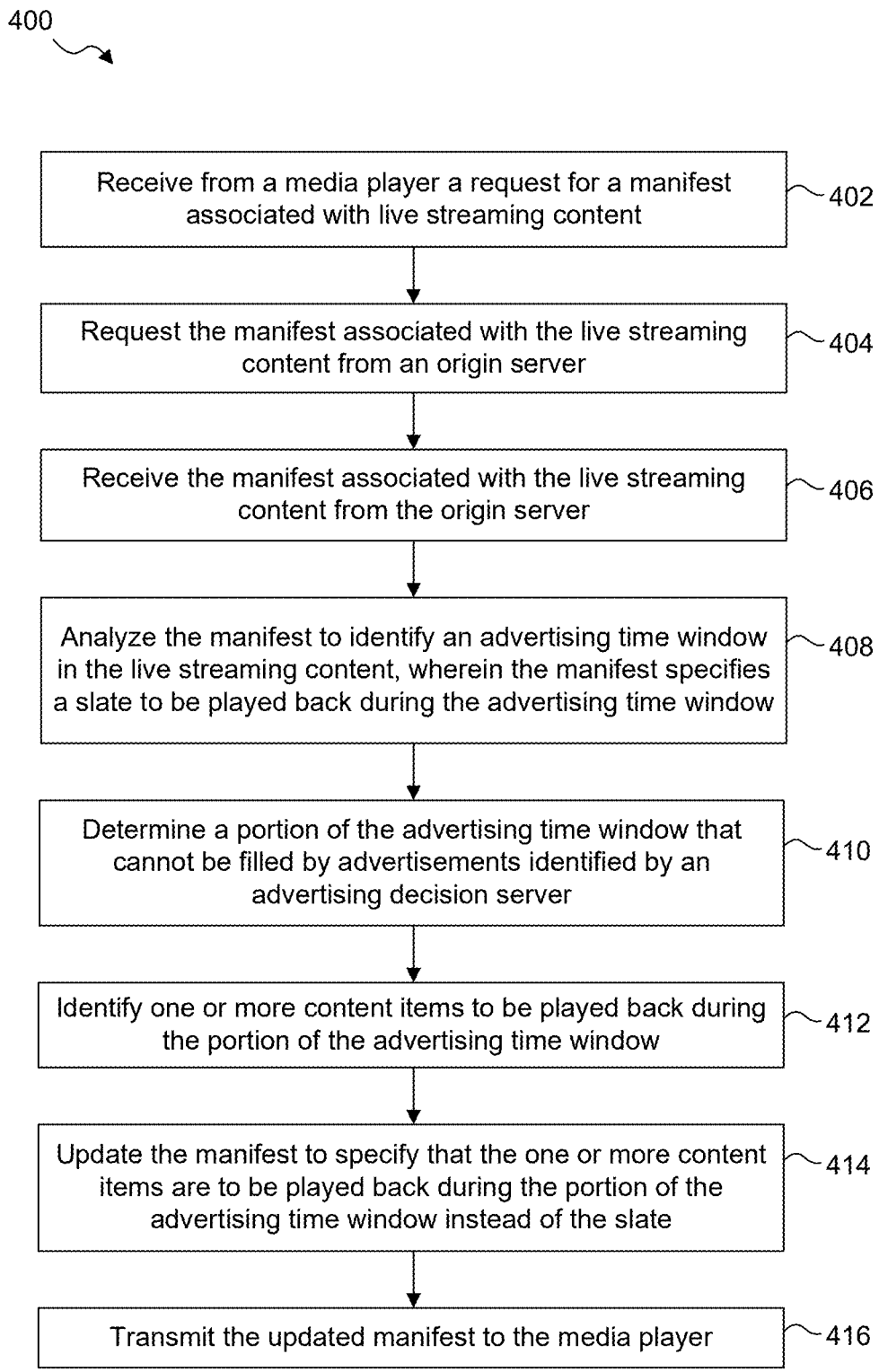
FIG. 4 illustrates a flow diagram of a method for avoiding slate playback during live streams through dynamic content filling, according to some embodiments.

FIG. 4 illustrates a flow diagram of a method 400 for avoiding slate playback during live streams through dynamic content filling, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 4, as will be understood by a person of ordinary skill in the art.

Method 400 shall be described with reference to FIG. 3. However, method 400 is not limited to that example embodiment.

In 402, manifest decorator 314 of server-side ad insertion system 306 receives from media player 302 a request for a manifest associated with live streaming content.

In 404, in response to receiving the request from media player 302, manifest decorator 314 requests the manifest associated with the live streaming content from origin server 304.

In 406, manifest decorator 314 receives the manifest associated with the live streaming content from origin server 304.

In 408, manifest decorator 314 analyzes the manifest associated with the live streaming content to identify an advertising time window (e.g., an ad break) in the live streaming content. As previously described, the manifest also specifies a slate to be played back during the advertising time window.

In 410, slate playback avoidance module 322 of manifest decorator 314 determines a portion of the advertising time window that cannot be filled by advertisements identified by ad decision server 308. Various ways in which slate playback avoidance module 322 may perform this step will be discussed below in reference to FIGS. 5-7. The portion of the advertising time window that cannot be filled by advertisements identified by ad decision server 308 may comprise less than an entirety of the advertising time window (e.g., a final portion of the advertising time window), or an entirety of the advertising time window.

In 412, slate playback avoidance module 322 of manifest decorator 314 identifies one or more content items in content items data store 316 to be played back during the portion of the advertising time window that was determined in 410. The identified one or more content items may comprise, for example and without limitation, one or more advertisements or promotions. The identified one or more content items may comprise for example, one or more items of video content, although the one or more content items may include other types of content (e.g., images, audio content, or the like).

In certain implementations, identifying the one or more content items to be played back during the portion of the advertising time window comprises selecting the one or more content items from content items data store 316 based at least on metadata associated with a live streaming session that has been established between media player 302 and server-side ad insertion system 306. Such metadata may include, for example and without limitation, user metadata and/or live streaming content metadata.

In further implementations, identifying the one or more content items to be played back during the portion of the advertising time window comprises identifying a plurality of content items in content items data store 316, wherein each content item in the plurality of content items has a different duration.

In still further implementations, identifying the one or more content items to be played back during the portion of the advertising time window comprises selecting a plurality of content items from content items data store 316 having a combined duration that comes closest to a duration of the portion of the advertising time window without exceeding the duration of the portion of the advertising time window.

In 414, manifest decorator 314 updates the manifest to specify that the one or more content items are to be played back during the portion of the advertising time window instead of the slate.

In 416, manifest decorator 314 transmits the updated manifest to media player 302.

Figure 5:
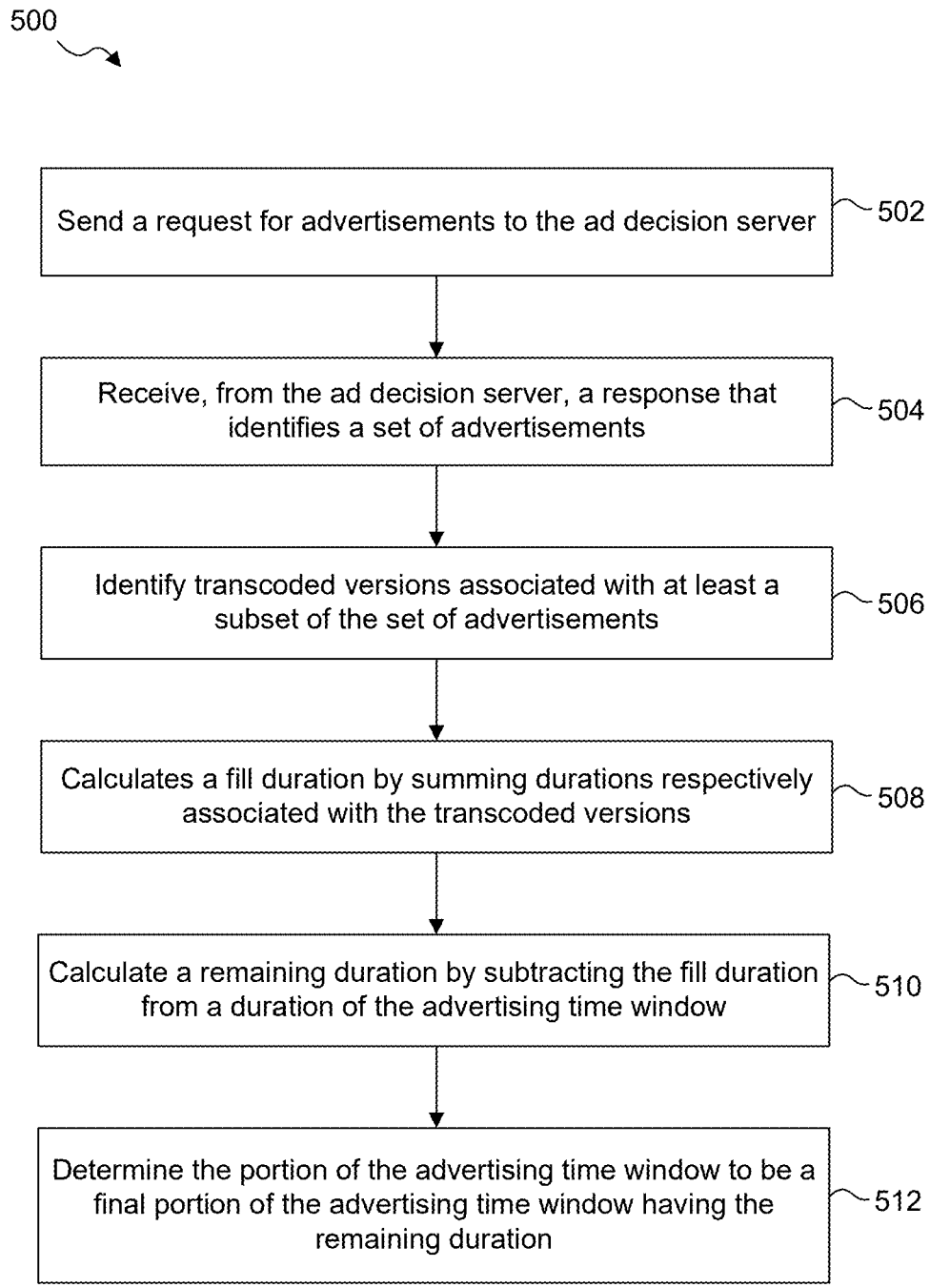
FIG. 5 illustrates a flow diagram of a method for determining a portion of an advertising time window in live streaming content that cannot be filled by advertisements identified by an advertising decision server.

FIG. 5 illustrates a flow diagram of a method 500 for determining a portion of an advertising time window in live streaming content that cannot be filled by advertisements identified by an ad decision server, according to some embodiments. Method 500 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

Method 500 shall be described with reference to FIG. 3. However, method 500 is not limited to that example embodiment. Furthermore, in the follow description, it will be assumed that method 500 is being be used to perform 410 of method 400. Thus, references to method 400 will also be included in the description.

In 502, manifest decorator 314 invokes ad decision server interactor 318 to send a request for advertisements to ad decision server 308.

In 504, manifest director 314 receives, from ad decision server 308 and via ad decision server interactor 318, a response that identifies a set of advertisements.

In 506, manifest director 314 identifies transcoded versions associated with at least a subset of the set of of advertisements. As previously discussed, such transcoded versions may have previously been generated by ad transcoder 324 of ad transcoding system 310 and stored in transcoded ads data store 326.

In 508, slate playback avoidance module 322 calculates a fill duration by summing durations respectively associated with the transcoded versions identified in 506.

In 510, slate playback avoidance module 322 calculates a remaining duration by subtracting the fill duration calculated in 508 from a duration of the advertising time window identified in 408.

In 512, slate playback avoidance module 322 determines the portion of the advertising time window that cannot be filled by advertisements identified by ad decision server 308 to be a final portion of the advertising window having the remaining duration calculated in 510.

Figure 6:
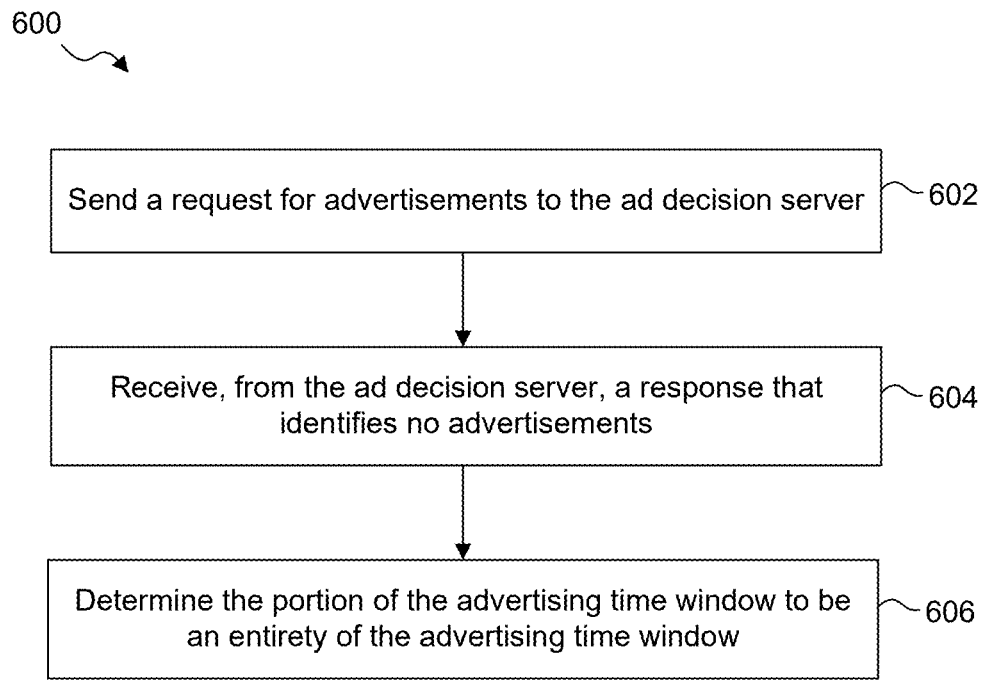
FIG. 6 illustrates a flow diagram of another method for determining a portion of an advertising time window in live streaming content that cannot be filled by advertisements identified by an advertising decision server, according to some embodiments.

FIG. 6 illustrates a flow diagram of another method 600 for determining a portion of an advertising time window in live streaming content that cannot be filled by advertisements identified by an ad decision server, according to some embodiments. Method 600 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 6, as will be understood by a person of ordinary skill in the art.

Method 600 shall be described with reference to FIG. 3. However, method 600 is not limited to that example embodiment. Furthermore, in the follow description, it will be assumed that method 600 is being be used to perform 410 of method 400. Thus, references to method 400 will also be included in the description.

In 602, manifest decorator 314 invokes ad decision server interactor 318 to send a request for advertisements to ad decision server 308.

In 604, manifest director 314 receives, from ad decision server 308 and via ad decision server interactor 318, a response that identifies no advertisements.

In 606, slate playback avoidance module 322 determines the portion of the advertising time window identified in 408 that cannot be filled by advertisements identified by ad decision server 308 to be an entirety of the advertising time window.

Figure 7:
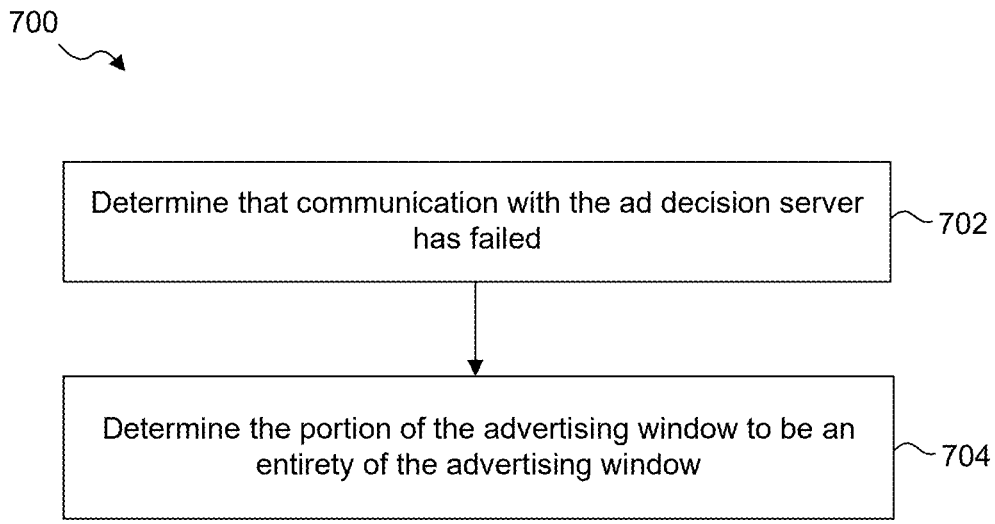
FIG. 7 illustrates a flow diagram of yet another method for determining a portion of an advertising time window in live streaming content that cannot be filled by advertisements identified by an advertising decision server, according to some embodiments.

FIG. 7 illustrates a flow diagram of yet another method 700 for determining a portion of an advertising time window in live streaming content that cannot be filled by advertisements identified by an ad decision server, according to some embodiments. Method 700 can be performed by processing logic that can comprise hardware (e.g., circuitry, dedicated logic, programmable logic, microcode, etc.), software (e.g., instructions executing on a processing device), or a combination thereof. It is to be appreciated that not all steps may be needed to perform the disclosure provided herein. Further, some of the steps may be performed simultaneously, or in a different order than shown in FIG. 7, as will be understood by a person of ordinary skill in the art.

Method 700 shall be described with reference to FIG. 3. However, method 700 is not limited to that example embodiment. Furthermore, in the follow description, it will be assumed that method 700 is being be used to perform 410 of method 400. Thus, references to method 400 will also be included in the description.

In 702, manifest decorator 314 determines that communication with ad decision server 308 has failed. Manifest decorator 314 may make such a determination before sending a request for advertisements to ad decision server 308, or after sending a request for advertisements to ad decision server 308.

In 704, based on the determination in 702 that communication with ad decision server 308 has failed, slate playback avoidance module 322 determines the portion of the advertising time window identified in 408 that cannot be filled by advertisements identified by ad decision server 308 to be an entirety of the advertising time window.

Example Computer System

Figure 8:
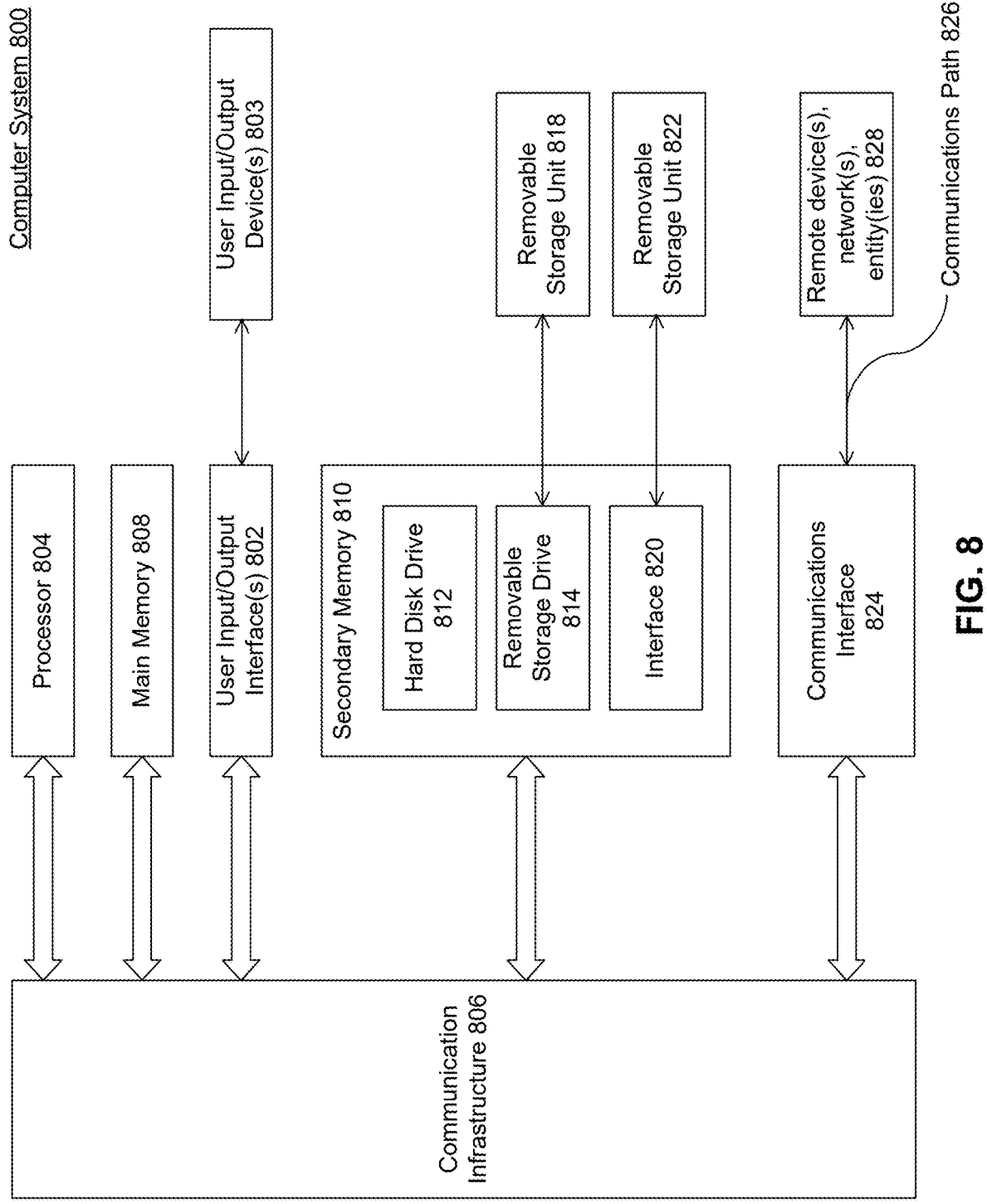
FIG. 8 illustrates an example computer system useful for implementing various embodiments.

Various embodiments may be implemented, for example, using one or more well-known computer systems, such as computer system 800 shown in FIG. 8. For example, one or more of media device(s) 106, content server(s) 120, system server(s) 126, server-side ad insertion system 134, media player 302, origin server 304, server-side ad insertion system 306, ad decision server 308, or ad transcoding system 310 may be implemented using computer system 800. Furthermore, one or more features of method 400, method 500, method 600 or method 700 may be implemented using computer system 800. Alternatively, one or more computer systems 800 may be used, for example, to implement any of the embodiments discussed herein, as well as combinations and sub-combinations thereof.

Computer system 800 may include one or more processors (also called central processing units, or CPUs), such as a processor 804. Processor 804 may be connected to a communication infrastructure or bus 806.

Computer system 800 may also include user input/output device(s) 803, such as monitors, keyboards, pointing devices, etc., which may communicate with communication infrastructure 806 through user input/output interface(s) 802.

One or more of processors 804 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include a main or primary memory 808, such as random access memory (RAM). Main memory 808 may include one or more levels of cache. Main memory 808 may have stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 may include a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 may read from and/or write to removable storage unit 818.

Secondary memory 810 may include other means, devices, components, instrumentalities or other approaches for allowing computer programs and/or other instructions and/or data to be accessed by computer system 800. Such means, devices, components, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 800 may further include a communication or network interface 824. Communication interface 824 may enable computer system 800 to communicate and interact with any combination of external devices, external networks, external entities, etc. (individually and collectively referenced by reference number 828). For example, communication interface 824 may allow computer system 800 to communicate with external or remote devices 828 over communications path 826, which may be wired and/or wireless (or a combination thereof), and which may include any combination of LANs, WANs, the Internet, etc. Control logic and/or data may be transmitted to and from computer system 800 via communication path 826.

Computer system 800 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 800 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 800 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800 or processor(s) 804), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, comprising:
   receiving, by at least one computer processor and from an origin server, a manifest associated with live streaming content;
   analyzing the manifest to identify an advertising time window in the live streaming content, wherein the manifest specifies a slate to be played back during the advertising time window;
   determining a portion of the advertising time window that cannot be filled by advertisements identified by an advertising decision server;
   identifying one or more content items to be played back during the portion of the advertising time window;
   updating the manifest to specify that the one or more content items are to be played back during the portion of the advertising time window instead of the slate; and
   transmitting the updated manifest to a media player.

2. The computer-implemented method of claim 1, wherein determining the portion of the advertising time window that cannot be filled by advertisements identified by the advertising decision server comprises:
   sending a request for advertisements to the advertising decision server;
   receiving, from the advertising decision server, a response that identifies a set of advertisements;
   identifying transcoded versions associated with at least a subset of the set of advertisements;
   obtaining a fill duration by summing durations respectively associated with the transcoded versions;
   subtracting the fill duration from a duration of the advertising time window to obtain a remaining duration; and
   determining the portion of the advertising time window to be a final portion of the advertising time window having the remaining duration.

3. The computer-implemented method of claim 1, wherein determining the portion of the advertising time window that cannot be filled by advertisements identified by the advertising decision server comprises:
  sending a request for advertisements to the advertising decision server;
  receiving, from the advertising decision server, a response that identifies no advertisements; and
  in response to receiving the response that identifies no advertisements, determining the portion of the advertising time window to be an entirety of the advertising time window.

4. The computer-implemented method of claim 1, wherein determining the portion of the advertising time window that cannot be filled by advertisements identified by the advertising decision server comprises:
  determining that communication with the advertising decision server has failed; and
  in response to determining that communication with the advertising decision server has failed, determining the portion of the advertising time window to be an entirety of the advertising time window.

5. The computer-implemented method of claim 1, further comprising:
  establishing a live streaming session with the media player; and
  maintaining metadata associated with the live streaming session;
  wherein identifying the one or more content items to be played back during the portion of the advertising time window comprises selecting the one or more content items based at least on the metadata associated with the live streaming session.

6. The computer-implemented method of claim 1, wherein the metadata associated with the live streaming session comprises one or more of:
  user metadata; or
  live streaming content metadata.

7. The computer-implemented method of claim 1, wherein identifying the one or more content items to be played back during the portion of the advertising time window comprises:
  identifying a plurality of content items, wherein each content item in the plurality of content items has a different duration.

8. The computer-implemented method of claim 1, wherein identifying the one or more content items to be played back during the portion of the advertising time window comprises:
  selecting a plurality of content items having a combined duration that comes closest to a duration of the portion of the advertising time window without exceeding the duration of the portion of the advertising time window.

9. A system, comprising:
  one or more memories; and
  at least one processor each coupled to at least one of the one or more memories and configured to perform operations comprising:
    receiving, from an origin server, a manifest associated with live streaming content;
    analyzing the manifest to identify an advertising time window in the live streaming content, wherein the manifest specifies a slate to be played back during the advertising time window;
    determining a portion of the advertising time window that cannot be filled by advertisements identified by an advertising decision server;
    identifying one or more content items to be played back during the portion of the advertising time window;
    updating the manifest to specify that the one or more content items are to be played back during the portion of the advertising time window instead of the slate; and
    transmitting the updated manifest to a media player.

10. The system of claim 9, wherein determining the portion of the advertising time window that cannot be filled by advertisements identified by the advertising decision server comprises:
  sending a request for advertisements to the advertising decision server;
  receiving, from the advertising decision server, a response that identifies a set of advertisements;
  identifying transcoded versions associated with at least a subset of the set of advertisements;
  obtaining a fill duration by summing durations respectively associated with the transcoded versions;
  subtracting the fill duration from a duration of the advertising time window to obtain a remaining duration; and
  determining the portion of the advertising time window to be a final portion of the advertising time window having the remaining duration.

11. The system of claim 9, wherein determining the portion of the advertising time window that cannot be filled by advertisements identified by the advertising decision server comprises:
  sending a request for advertisements to the advertising decision server;
  receiving, from the advertising decision server, a response that identifies no advertisements; and
  in response to receiving the response that identifies no advertisements, determining the portion of the advertising time window to be an entirety of the advertising time window.

12. The system of claim 9, wherein determining the portion of the advertising time window that cannot be filled by advertisements identified by the advertising decision server comprises:
  determining that communication with the advertising decision server has failed; and
  in response to determining that communication with the advertising decision server has failed, determining the portion of the advertising time window to be an entirety of the advertising time window.

13. The system of claim 9, the operations further comprising:
  establishing a live streaming session with the media player; and
  maintaining metadata associated with the live streaming session;
  wherein identifying the one or more content items to be played back during the portion of the advertising time window comprises selecting the one or more content items based at least on the metadata associated with the live streaming session.

14. The system of claim 9, wherein the metadata associated with the live streaming session comprises one or more of:
  user metadata; or
  live streaming content metadata.

15. The system of claim 9, wherein identifying the one or more content items to be played back during the portion of the advertising time window comprises:

identifying a plurality of content items, wherein each content item in the plurality of content items has a different duration.

16. The system of claim 9, wherein identifying the one or more content items to be played back during the portion of the advertising time window comprises:
selecting a plurality of content items having a combined duration that comes closest to a duration of the portion of the advertising time window without exceeding the duration of the portion of the advertising time window.

17. A non-transitory computer-readable medium having instructions stored thereon that, when executed by at least one computing device, cause the at least one computing device to perform operations comprising:
receiving, from an origin server, a manifest associated with live streaming content;
analyzing the manifest to identify an advertising time window in the live streaming content, wherein the manifest specifies a slate to be played back during the advertising time window;
determining a portion of the advertising time window that cannot be filled by advertisements identified by an advertising decision server;
identifying one or more content items to be played back during the portion of the advertising time window;
updating the manifest to specify that the one or more content items are to be played back during the portion of the advertising time window instead of the slate; and
transmitting the updated manifest to a media player.

18. The non-transitory computer-readable medium of claim 17, the operations further comprising:
establishing a live streaming session with the media player; and
maintaining metadata associated with the live streaming session, wherein the metadata associated with the live streaming session comprises one or more of user metadata or live streaming content metadata;
wherein identifying the one or more content items to be played back during the portion of the advertising time window comprises selecting the one or more content items based at least on the metadata associated with the live streaming session.

19. The non-transitory computer-readable medium of claim 17, wherein identifying the one or more content items to be played back during the portion of the advertising time window comprises:
identifying a plurality of content items, wherein each content item in the plurality of content items has a different duration.

20. The non-transitory computer-readable medium of claim 17, wherein identifying the one or more content items to be played back during the portion of the advertising time window comprises:
selecting a plurality of content items having a combined duration that comes closest to a duration of the portion of the advertising time window without exceeding the duration of the portion of the advertising time window.

\* \* \* \* \*